United States Patent [19]
McCord

[11] Patent Number: 5,988,943
[45] Date of Patent: Nov. 23, 1999

[54] LIQUID DISTRIBUTION DEVICE FOR DRAINFIELDS

[76] Inventor: Brent McCord, 8194 Winstead Pl., #202, Manassas, Va. 20109

[21] Appl. No.: 08/932,484

[22] Filed: Sep. 18, 1997

[51] Int. Cl.$^6$ .................................................. E02B 11/00
[52] U.S. Cl. ............................... 405/36; 405/43; 405/45; 138/44; 210/170; 210/532.2
[58] Field of Search .................. 405/36, 43, 45; 137/501, 561 A, 561 R; 210/418, 291, 170, 532.2, 519; 138/44

[56] References Cited

U.S. PATENT DOCUMENTS

| | | | |
|---|---|---|---|
| 2,536,196 | 1/1951 | MacLeod | 405/43 |
| 3,233,627 | 2/1966 | Cebula | 137/561 R |
| 3,812,876 | 5/1974 | Krieter | 137/501 |
| 3,986,963 | 10/1976 | Maroschak | 210/532 |
| 4,452,277 | 6/1984 | Wells | 138/44 |
| 4,516,986 | 5/1985 | Jepsen | 138/44 X |
| 4,605,501 | 8/1986 | Tyson | 210/519 |
| 4,614,584 | 9/1986 | DiDuca | 210/422 |
| 4,681,684 | 7/1987 | Maroschak | 210/532.2 |
| 4,756,827 | 7/1988 | Mayer | 210/170 |
| 4,834,879 | 5/1989 | Stegall et al. | 210/205 |
| 5,098,568 | 3/1992 | Tyson | 210/519 |
| 5,181,532 | 1/1993 | Brodefors et al. | 138/44 X |
| 5,458,436 | 10/1995 | Plowman et al. | 405/36 |
| 5,597,264 | 1/1997 | Laak | 405/43 X |

*Primary Examiner*—David Bagnell
*Assistant Examiner*—Jong-Suk Lee
*Attorney, Agent, or Firm*—Harold H. Dutton, Jr.

[57] ABSTRACT

A liquid distribution device for connection to a sewage disposal system comprising a manifold pipe having an inlet and a plurality of outlets, the inlet being oriented for connection to a source of liquid sewage effluent, and the outlets each being oriented for connection to a lead or header line in a drainfield of the system, the outlets being substantially coplanar with each other and with the manifold pipe, and an orifice in each of the outlets for controlling the flow of liquid through the outlets to the absorption lines.

6 Claims, 2 Drawing Sheets

5,988,943

LIQUID DISTRIBUTION DEVICE FOR DRAINFIELDS

This invention relates to a liquid distribution device particularly adapted for use in drainfields. More particularly, the invention relates to a liquid distribution device which provides improved flow control for liquid distribution in drainfields.

BACKGROUND AND OBJECTS OF THE INVENTION

In the sewage disposal art, drainfields are used to distribute liquid effluent into the soil for percolation into the ground. Typically, a collection tank collects the raw sewage, and a primary settling of solids occurs in that tank. A liquid line receives liquid effluent from the settling tank and conveys the fluid either by gravity or by pumping to a distribution tank. The liquid in the distribution tank then flows from the tank through a series of lines into the drainfield, where the liquid percolates into the ground.

The distribution tank is typically a large concrete tank, and a plurality of openings are formed in a sidewall of the tank for connection to the drainfield lines. For the most efficient use of the drainfield, it is important that the liquid be distributed even into the multiple discharge lines exiting the distribution box. Only with even distribution of the liquid are the drainfield lines evenly used. For example, if the openings out of the distribution box are not precisely level, then the lowermost line will receive more liquid effluent than the higher line. This will result in uneven absorption in the drainfield, and can cause premature failure of the drainfield.

However, the quality of the installation of the drainfield lines is largely a matter of the skill of the installer. Because the distribution box is a large concrete tank, it is quite heavy and not easily moved. For this reason, the outlet holes are generally drilled or chiseled into the wall of the box after the box is installed in the ground. The liquid flows into the distribution box until it reaches the level of the outlets, and then flows outwardly through the outlets into the absorption lines in the drainfield. After these holes are made in the wall of the box, the drain lines are connected to the outlet holes.

The prior art has attempted to deal with the problem of creating an even discharge flow through a number of different techniques. For example, U.S. Pat. No. 4,756,827 discloses a metering device which comprises an end cap for the distribution lines with a circular opening formed in the end cap offset from the center of the cap. By rotating the cap, the height of the opening may be precisely adjusted.

Another solution is proposed in U.S. Pat. No. 5,098,568, which provides a fixed flow divider in order to apportion the effluent discharge.

Still another solution to the problem is provided in U.S. Pat. No. 4,614,584 which incorporates a screening device and a flow control to equally apportion the discharge.

Unfortunately, while prior attempts to solve the problems with distribution boxes have had varying degrees of success, they still have not fully solved the problems in an economical fashion, and each has drawbacks.

Accordingly the primary object of the present invention is to provide an improved liquid distribution device for use with sewage disposal drainfields.

Another object of this invention is to provide a liquid distribution device which may be easily installed.

Yet a further object of this invention is to provide a liquid distribution device which includes a metering opening for each of the distribution lines.

Still another object of this invention is to provide a liquid distribution device which may be easily levelled in order to provide accurately distributed fluid flow to the drainfield.

Yet another object of this invention is to provide a liquid distribution device which is inexpensive and easy to manufacture.

SUMMARY OF THE INVENTION

The distribution device according to this invention comprises a header or manifold pipe having an inlet and a plurality of horizontal outlet fittings. The number of outlet fittings is generally equal to the number of absorption lines in the drainfield, and typically is four or more. In some cases it is preferable to use multiple devices rather than providing a large number of outlets. For example, two devices of four outlets may be more desirable in some cases than one device with eight outlets. This also allows more flexibility in the location of the installation.

Generally the manifold pipe is a two inch pipe, such as polyvinyl chloride (PVC) pipe, and can be made from a plurality of T-fittings, the cross-pieces of the connected by short pieces of the pipe. Each of the outlet fittings is preferably of the same size. However, each of the outlet fittings is provided with a metering orifice opening of considerably smaller diameter, for example about one-half inch, for controlling the flow of effluent out of the respective fitting and the manifold pipe. Each of the orifices is the same size.

The inlet into the device may be vertical or horizontal, depending on the design of the system and whether the distribution device is used as a gravity system or a pressure system. For a gravity system, for example, it would be necessary to have the vertical inlet in order to provide a hydraulic gradient. With a pressure system, the pressure is provided by the system, and no other head pressure need be provided.

Each of the outlets is provided with an orifice for controlling the flow of liquid leaving the manifold pipe through the outlets. For example, in a system using a two inch manifold pipe, a one-half inch orifice has been found to be appropriate for the orifice size in the outlets. Each outlet is connected to one absorption line, and the orifices provide for a uniform discharge through each outlet and uniform distribution of the liquid effluent into the absorption lines in the drainfield.

The device described is lightweight and easily installed and levelled in a drainfield installation. For example, the device will ordinarily be bedded in sand in a suitably sized trench, and levelled using a carpenters level or a transit and rod. Once installed, accurate metering of equal volumes of liquid is maintained by means of the orifices in the outlet fittings leading to the absorption lines.

BRIEF DESCRIPTION OF THE DRAWINGS

The invention will now be described with reference to the accompanying drawings which show by way of non-limiting example, one preferred embodiment of the invention, and in which.

DETAILED DESCRIPTION OF PREFERRED EMBODIMENTS

Figure 1:
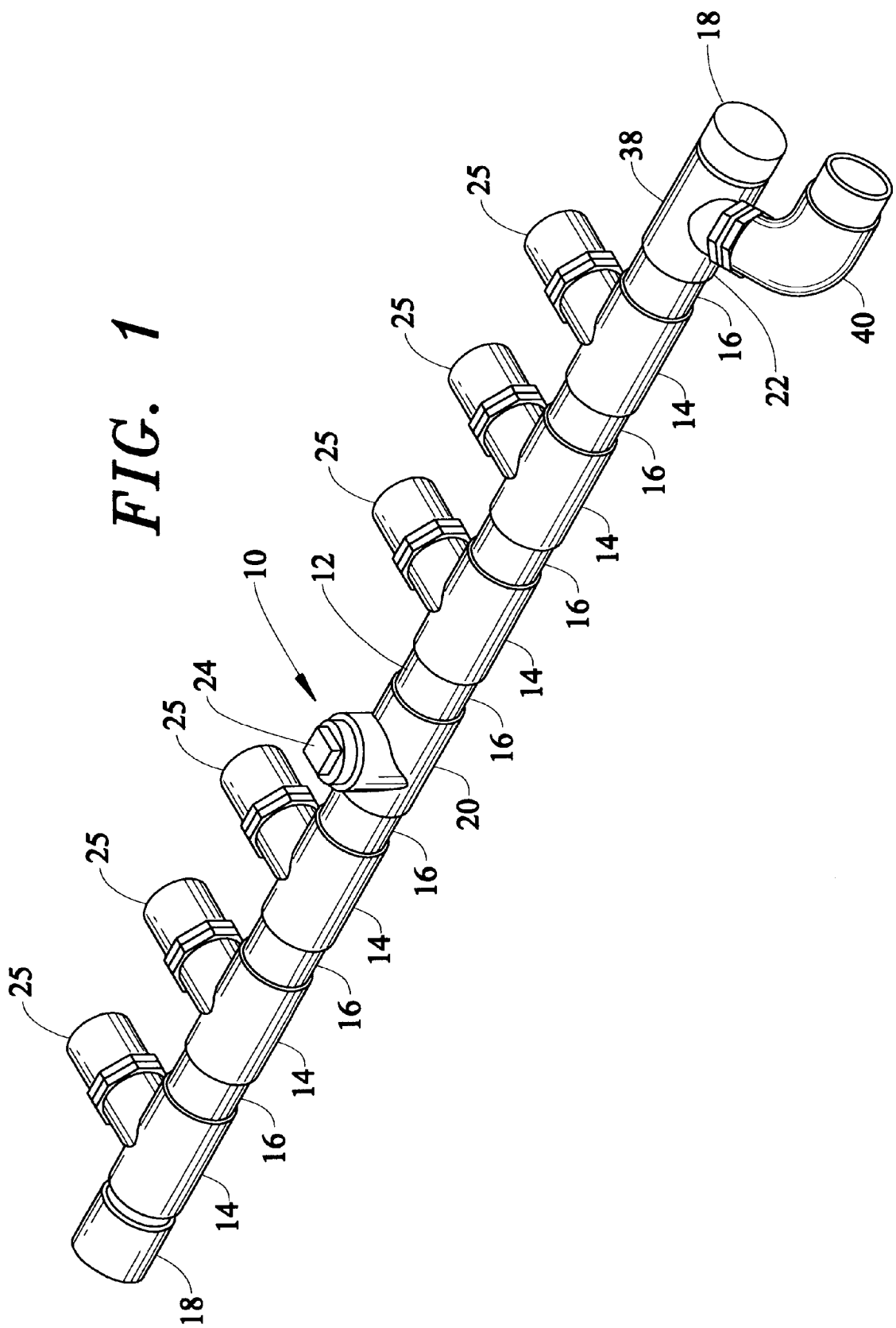
FIG. 1 is a perspective view of a distribution device according to the present invention.

Referring to FIG. 1, the distribution device according to the invention is generally designated 10 and is seen to comprise a manifold pipe 12 preferably made of polyvinyl chloride pipe and fittings of the type known as "Schedule 40" pipe, commonly used in sewage disposal systems. The manifold pipe 12 is made up of a plurality of tee fittings 14 connected by pieces of pipe 16. The tee fittings 14 are oriented such that the cross-pieces of the tee lie on the horizontal axis of the manifold pipe 12, and the longitudinal axes of the legs of the tee each lie in the same plane as the longitudinal axis of the header pipe 12.

At the ends of the manifold pipe 12, end caps 18 are provided for closing the ends of the device. Near the mid-point of the manifold pipe 12 is a cross fitting 20 in which two legs of the cross fitting tee are vertically oriented, that is orthogonally to the plane of the tee fittings 14. Additionally, a fitting 22 is provided at the other end, and this may be downwardly oriented and connected to another outlet fitting, and would function as a drain also.

The fitting 20 is shown with a removable plug 24. In the case of a gravity system, no plug is used and the fitting 20 is connected to the conveyance line from the pretreatment unit (septic tank) so as to receive liquid effluent for distribution to the drainfield. In this case, a simple outlet is provided in the septic tank, and no particular detail or installation is required for that tank. In some cases, it may be desirable to provide a screen in the outlet of the pretreatment unit (septic tank) in a known manner to retain solids and prevent clogging of the outlets in the distribution device.

Connected to each of the tee fittings 14 is an outlet fitting 25.

Figure 2:
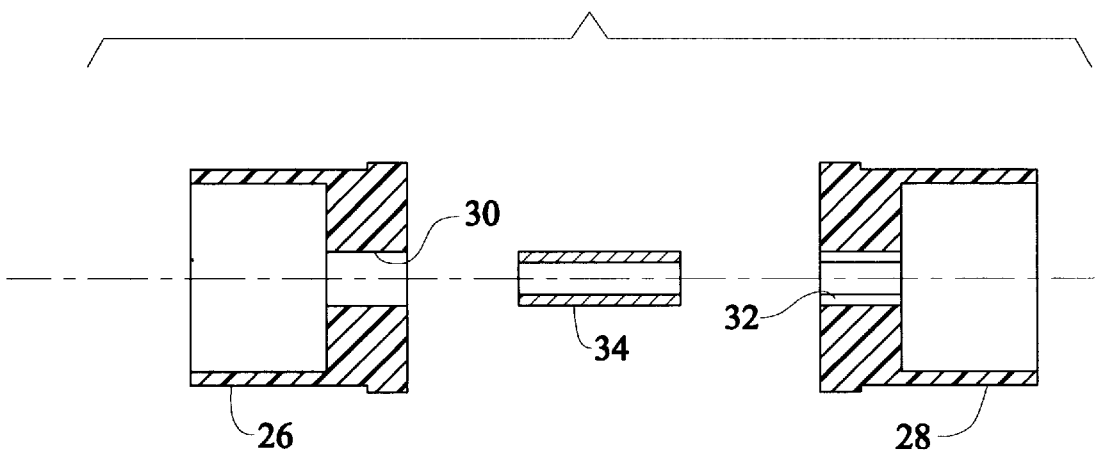
FIG. 2 is an exploded longitudinal cross-sectional view of one of the metering fittings used in the distribution device.
Figure 3:
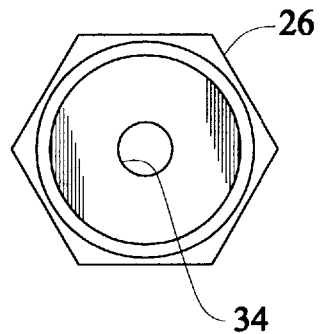
FIG. 3 is an end view of one of the metering fittings.
Figure 4:
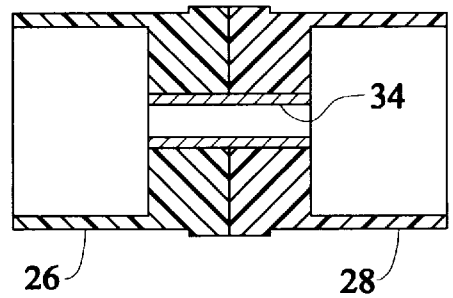
FIG. 4 is a longitudinal cross-sectional view of one of the outlet metering fittings.

Referring to FIGS. 2–4, each of the outlet fittings 25 is seen to comprise a pair of end caps 26 and 28 which are placed in back-to-back relationship and secured together, for example by solvent welding. Openings 30, 32 are then bored or drilled through the end caps. A short piece of small diameter pipe 34 is then inserted into the openings 30, 32 and bonded in place, preferably by solvent welding. The resulting outlet fitting is connected to one of the outlet tee fittings 14 by means of another length of two inch pipe connected to either of the end caps 26 or 28.

The outlets 25 are in turn connected to the absorption lines which extend to the drainfield. By means of this construction, the liquid effluent is metered by the orifices formed by the pipe pieces 34 in the outlets 25. Even flow of liquid to each of the absorption lines is established and maintained in this manner.

The tee fitting 38 may be adjusted to allow a pressure operated distribution box to drain through the fitting 40 when not in use.

While this invention has been described as having certain preferred features and embodiments, it will be apparent that it is capable of still further variation and modification without departing from the spirit of the invention, and this application is intended to cover any and all variations, modifications and adaptations of the invention as may fall within the spirit of the invention and the scope of the appended claims.

I claim:

1. A liquid distribution device for connection to a sewage disposal system comprising a manifold pipe having an inlet and a plurality of outlets for connection to absorption lines in the sewage disposal system, said inlet being oriented for connection to a source of liquid sewage effluent, and said outlets each being oriented for connection to absorption lines in a drainfield of the sewage disposal system, said outlets being substantially coplanar with each other and with said absorption lines, and an orifice in each of said outlets for controlling the flow of liquid through the outlets, said manifold pipe comprising a plurality of tees having crosspieces and legs, the crosspieces of each of said tees being connected by sections of the manifold pipe, and said outlets comprising a conduit of substantially the same diameter as the manifold pipe and said orifice formed in said conduit, wherein said outlets comprise the legs of said tees and a pair of end caps having an aperture formed therein.

2. The liquid distribution device as in claim 1 and wherein said inlet comprises a cross fitting with one of said legs thereof being vertically upwardly oriented.

3. The liquid distribution device as in claim 1 and wherein said manifold pipe comprises a horizontal conduit having a plurality of horizontal conduit sections extending orthogonally therefrom and forming said outlets, and a vertical conduit extending orthogonally therefrom and forming said inlet.

4. The liquid distribution device as in claim 1 and wherein the orifice in each of said outlets is the same size.

5. The liquid distribution device as in claim 1 and wherein the flow of liquid from said source through said distribution device to an absorption field is gravity flow.

6. The liquid distribution device as in claim 1 and wherein the flow of liquid from said source through said distribution device to an absorption field is low pressure flow.

* * * * *